US007124423B2

(12) United States Patent
Eum et al.

(10) Patent No.: US 7,124,423 B2
(45) Date of Patent: Oct. 17, 2006

(54) DISK CARTRIDGE TO PROTECT AN INFORMATION AREA OF A DISK FROM BEING CONTAMINATED

(75) Inventors: Jae-yong Eum, Suwon (KR); Hong-kyun Yim, Suwon (KR); Yong-hoon Lee, Suwon (KR); Han-kook Choi, Suwon (KR); Chong-sam Chung, Suwon (KR); Takizawa Teruyuki, Neyagawa (JP); Saji Yoshito, Nishinomiya (JP)

(73) Assignees: Samsung Electronics Co., Ltd., Suwon-si (KR); Matsushita Electric Industrial Co., Ltd., Osaka (JP)

( * ) Notice: Subject to any disclaimer, the term of this patent is extended or adjusted under 35 U.S.C. 154(b) by 319 days.

(21) Appl. No.: 10/369,130

(22) Filed: Feb. 20, 2003

(65) Prior Publication Data

US 2003/0179696 A1 Sep. 25, 2003

Related U.S. Application Data

(60) Provisional application No. 60/357,657, filed on Feb. 20, 2002.

(51) Int. Cl.
*G11B 23/03* (2006.01)
(52) U.S. Cl. ...................... 720/739; 360/133
(58) Field of Classification Search ................ 360/133, 360/132; 720/738, 743, 741, 739
See application file for complete search history.

(56) References Cited

U.S. PATENT DOCUMENTS 4,652,961 A * 3/1987 Dieffenbach ................ 360/133

2003/0128653 A1* 7/2003 Choi et al. .................. 369/291

FOREIGN PATENT DOCUMENTS

| JP | 61-6974 | 1/1986 |
| JP | 10-222946 | 8/1998 |
| JP | 2000-113630 | 4/2000 |
| JP | 2000-123521 | 4/2000 |

* cited by examiner

*Primary Examiner*—David Davis
(74) *Attorney, Agent, or Firm*—Stein, McEwen & Bui, LLP

(57) ABSTRACT

A disk cartridge includes a lower case having an opening formed thereon, an upper case installed at the lower case to be capable of being open and shut while pivoting, to accommodate a disk therebetween, a shutter installed at the lower case to be capable of sliding and opening and shutting the opening hole, a close covering member having an inclined surface installed at the shutter to be capable of sliding, closely contacting a non-information area disposed at an inner circumference of the disk when the shutter is closed, and being separated from the non-information area disposed at the inner circumference of the disk when the shutter is open. Thus, when the shutter is closed, introduction of dust is prevented so that the possibility of the information area of the disk being contaminated is lowered. Also, since the disk is fixed between the upper and lower cases, while the disk is carried, noise and damage can be reduced.

57 Claims, 10 Drawing Sheets

DISK CARTRIDGE TO PROTECT AN INFORMATION AREA OF A DISK FROM BEING CONTAMINATED

CROSS-REFERENCE TO RELATED APPLICATIONS

This application claims the benefit of U.S. Provisional Application No. 60/357,657, filed Feb. 20, 2002, in the United States Patent and Trademark Office, the disclosure of which is incorporated herein by reference.

BACKGROUND OF THE INVENTION

1. Field of the Invention

The present invention relates to a disk cartridge protecting a recording surface of an accommodated disk that is an information recording/reproduction medium, from contaminants, such as dust or a fingerprint.

2. Description of the Related Art

In general, a disk cartridge accommodates a disk that is an information recording/reproduction medium and is installed in a disk drive. As shown in FIG. 1, a conventional disk cartridge 100 includes a case 101 accommodating a disk D, a shutter 110 installed in the case 101 to be capable of rotating to selectively open and shut an opening 102 formed on the case 101 so that a pickup (not shown) of a disk drive can access the disk D, and a cover 103 fixed on an upper portion of the case 101. The disk cartridge 100 further includes a hole 103 formed on the cover 103 for disk exchange and clamping, and an escape prevention lever 103a installed at the cover 103 to be capable of sliding to prevent the disk D from escaping through the hole 103b. Thus, when the disk D is installed, the escape prevention lever 103a is pulled back not to interfere with the disk D. After the disk installation is completed, the escape prevention lever 103a is pushed forward so that an end portion of the escape prevention lever 103a prevents the disk D from escaping through the hole 103b.

When the disk cartridge 100 accommodating the disk D is inserted into the disk drive, as shown in FIG. 2A, an opening lever 120 installed at the disk drive pushes a locking piece 111a so that a protrusion 111c of the shutter 110 is unlocked from a groove 101a of the case 101. Then, the opening lever 120 pushes an interference piece 111b to have the shutter 110 pivot with respect to the case 101. The shutter 110 includes first and second shutter portions 111 and 112 respectively installed to pivot around left and right pivot shafts 110a and engaging each other through an engagement gear portion 113. As the first shutter portion 111 incorporated with the interference piece 111b rotates clockwise, the second shutter portion 112 rotates counterclockwise so that the first and second shutter portions 111 and 112 are separated from each other to open the opening 102. Then, a turntable (not shown) and a damper (not shown) of the disk drive pass through the opening 102 and the hole 103a, respectively, to clamp the disk D. A pickup (not shown) accesses a recording surface (information area) of the disk D to perform an information recording and/or reproducing process. Although not shown in FIGS. 1 through 2B, a torsion spring elastically biasing the first shutter portion 111 in a counterclockwise direction on FIGS. 1 through 2B, that is, in a direction to close the opening 102, is installed between the first shutter portion 111 and a bottom surface of the case 101. When a force applied by the opening lever 120 is removed, the shutter 110 is returned to an original closed position.

However, in the above structure, since the shutter 110 is installed in the case 101, and the disk D is placed on the shutter 110, during an opening/shutting operation of the shutter 110, the shutter 110 contacts the recording surface of the disk D (a lower surface of a disk in the drawings) so that the recording surface of the disk D may be scratched by the shutter 110 to be damaged.

Also, dust can be introduced through the hole 103b of the cover 103. Of course, since an upper surface of the disk D facing the hole 103b is not a surface for recording, direct contamination due to the dust does not occur. Nonetheless, as the dust is introduced into the case 101 and placed on the shutter 110, the dust on the shutter 110 adheres to the recording surface of the disk D during the opening/shutting operation. Therefore, an improved structure to protect the information area of the disk D is needed.

SUMMARY OF THE INVENTION

To solve the above and/or other problems, it is an aspect of the present invention to provide an improved disk cartridge which can protect an information area of a disk from being contaminated during an opening/shutting operation of a shutter installed in a case.

Additional aspects and advantages of the invention will be set forth in part in the description which follows and, in part, will be obvious from the description, or may be learned by practice of the invention.

To achieve the above and/or other aspects, a disk cartridge includes a lower case having an opening formed thereon, an upper case installed at the lower case to be open and shut while pivoting, to accommodate a disk therebetween, a shutter installed at the lower case to be capable of sliding to open and shut the opening, a close covering member installed at the shutter to slide to closely contact a non-information area formed at an inner circumference of the disk when the shutter is closed, and to be separated from the non-information area of the inner circumference of the disk when the shutter is open.

According to another aspect of the present invention, the close covering member includes a space portion having an inclined surface and closely contacting or being separated from the non-information area formed at an inclined circumference of the disk while the disk is raised or is lowered along an inner inclined surface of a cut-away portion formed on the shutter, a sliding portion sliding along a slot formed on the shutter during opening/shutting of the shutter, and a lever portion connecting the space portion and the sliding portion to be elastically deformed.

It is possible that a sealing member is provided on an upper surface of the space portion so that the non-information area of the inner circumference of the disk closely contacts the close covering member.

It is possible that an inclined portion is provided at the slot of the shutter, when the space portion rises, the sliding portion is raised from a lower surface of the shutter, and when the space portion is lowered, the sliding portion is lowered to the lower surface of the shutter.

It is possible that an interference portion interfering with the sliding portion of the close covering member such that the sliding portion is smoothly lowered when the shutter is open, is provided at the lower case.

It is possible that the interference portion is disposed at an angle less than a maximum open angle of the shutter.

It is possible that a parking portion is formed at the lower case so that the space portion is disposed at the parking portion when the shutter is open.

It is possible that a protrusion having an inclined surface and supporting the non-information area of the disk is provided at the shutter so that, when the shutter is open, the disk is raised along the inclined surface of the protrusion to closely contact the upper case.

It is possible that the protrusion supporting the non-information area of the inner circumference of the disk that is lowered along the inclined surface, is provided at the lower case.

It is possible that a sealing member is provided at the upper case at a portion of contacting the non-information area of the disk so that the disk closely contacts the sealing member.

BRIEF DESCRIPTION OF THE DRAWINGS

The above and/or aspects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Figure 1:
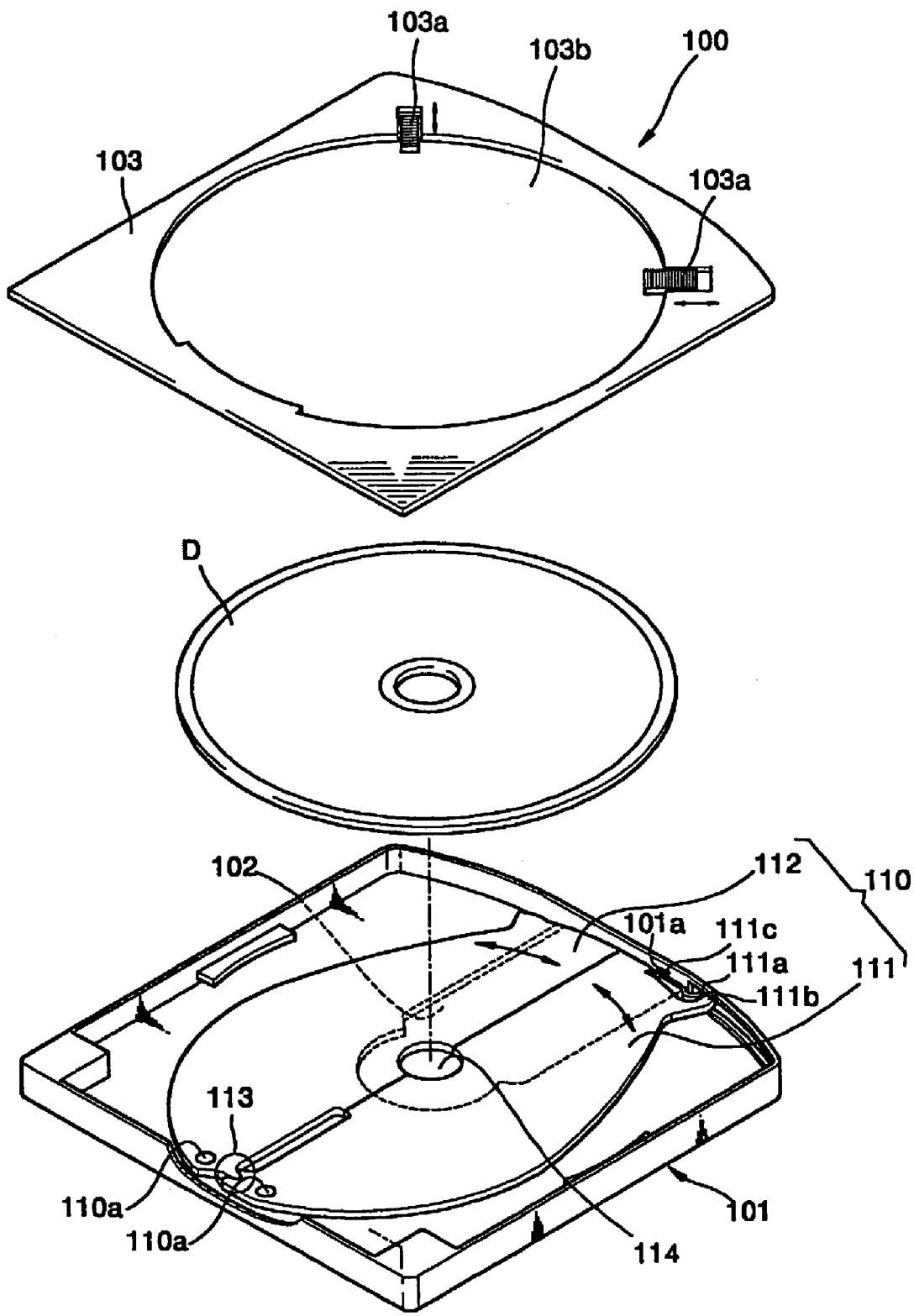
FIG. 1 is a perspective view of a conventional disk cartridge.
Figure 2A:
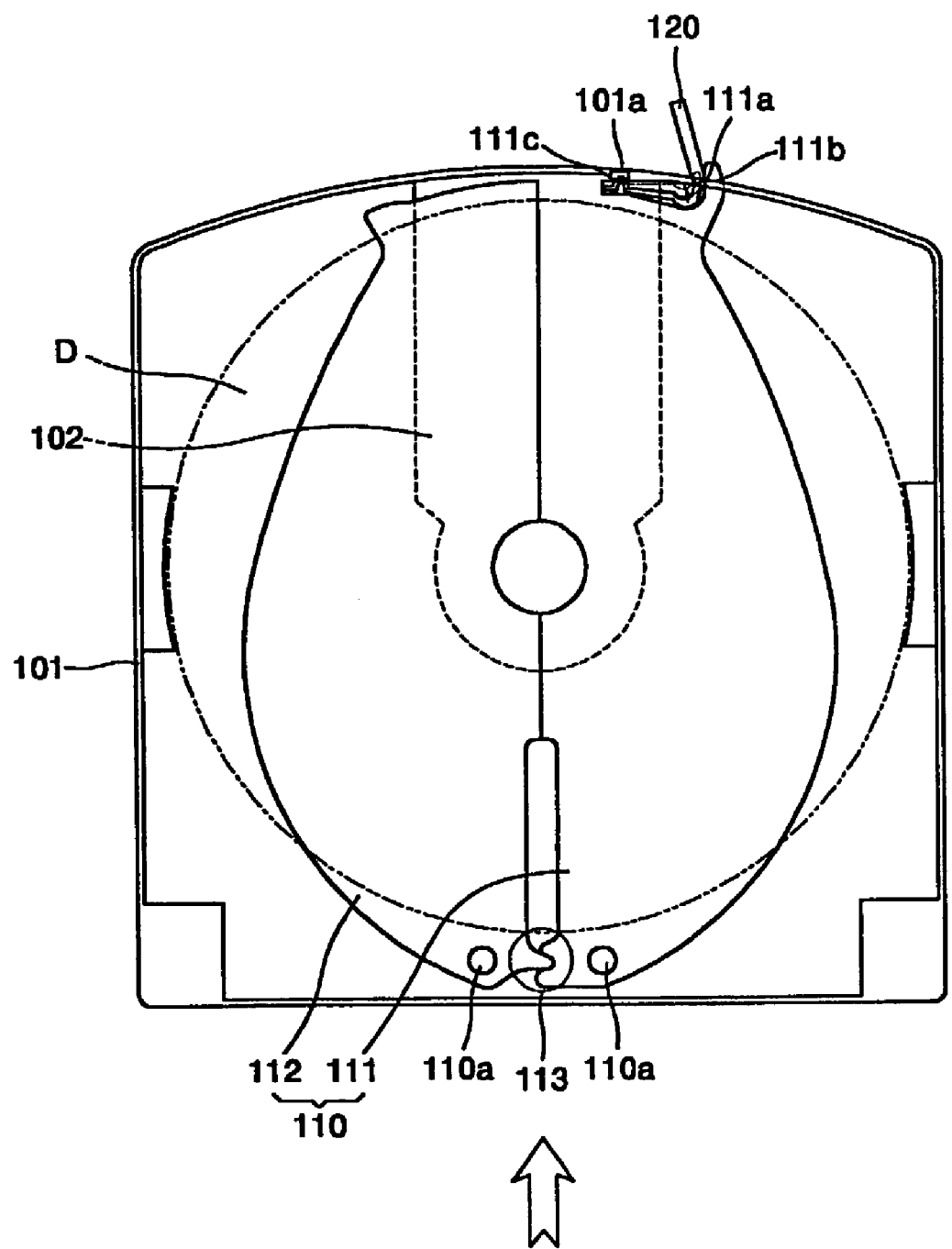
FIGS. 2A and 2B are plan views showing states of opening/shutting of a shutter of the disk cartridge shown in FIG. 1.
Figure 2B:
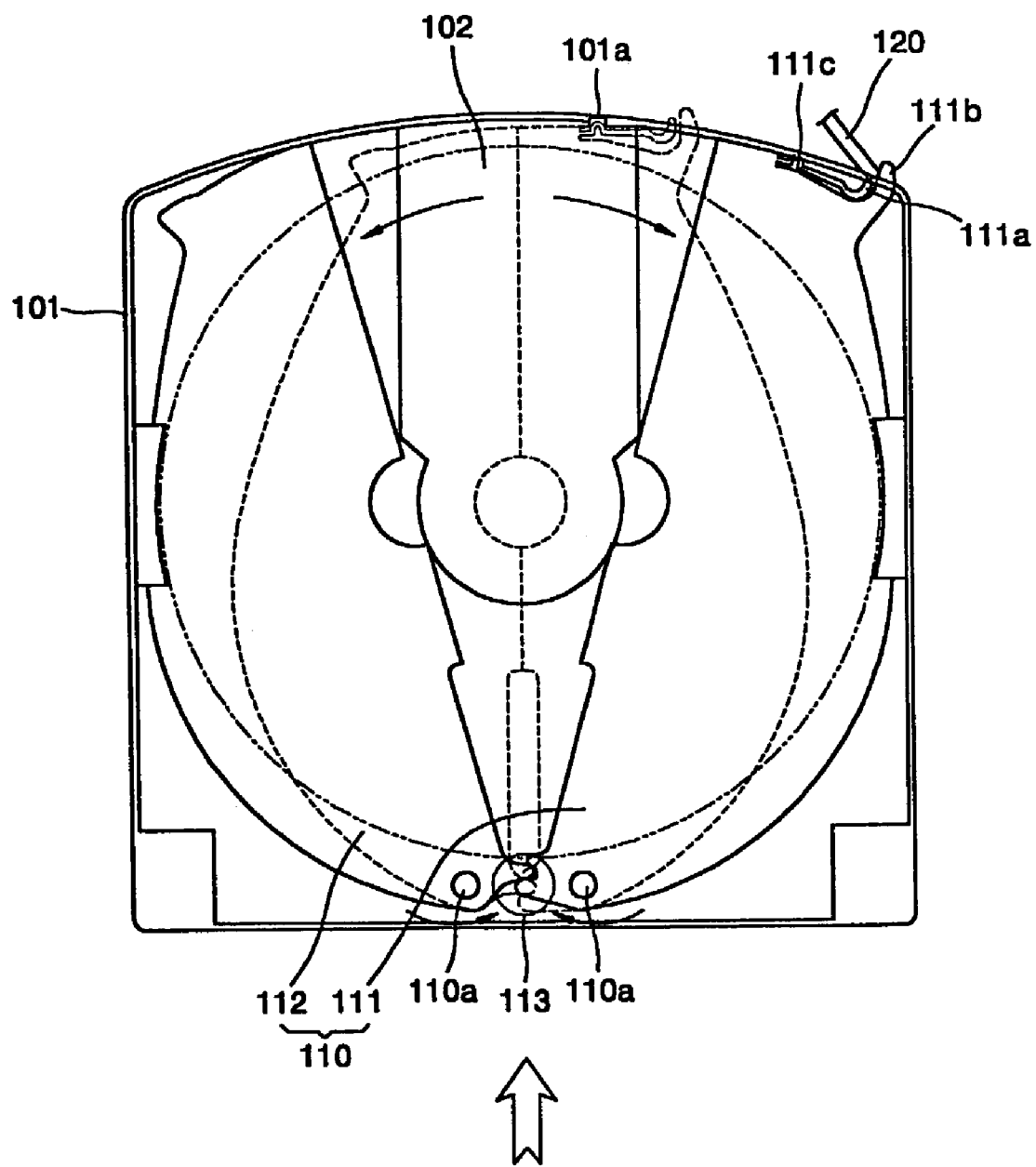

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Figure 3:
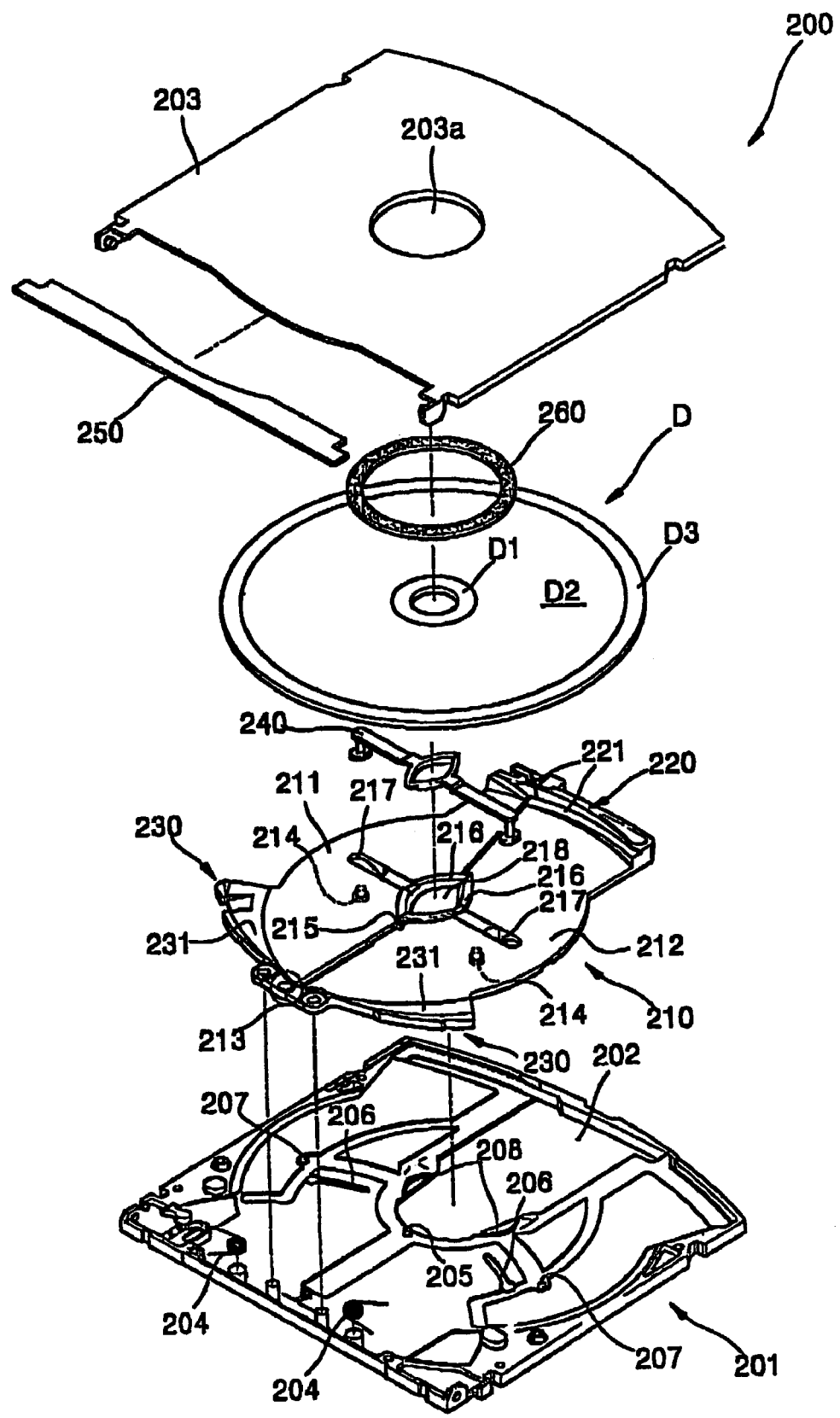
FIG. 3 is an exploded perspective view of a disk cartridge according to an embodiment of the present invention.
Figure 4:
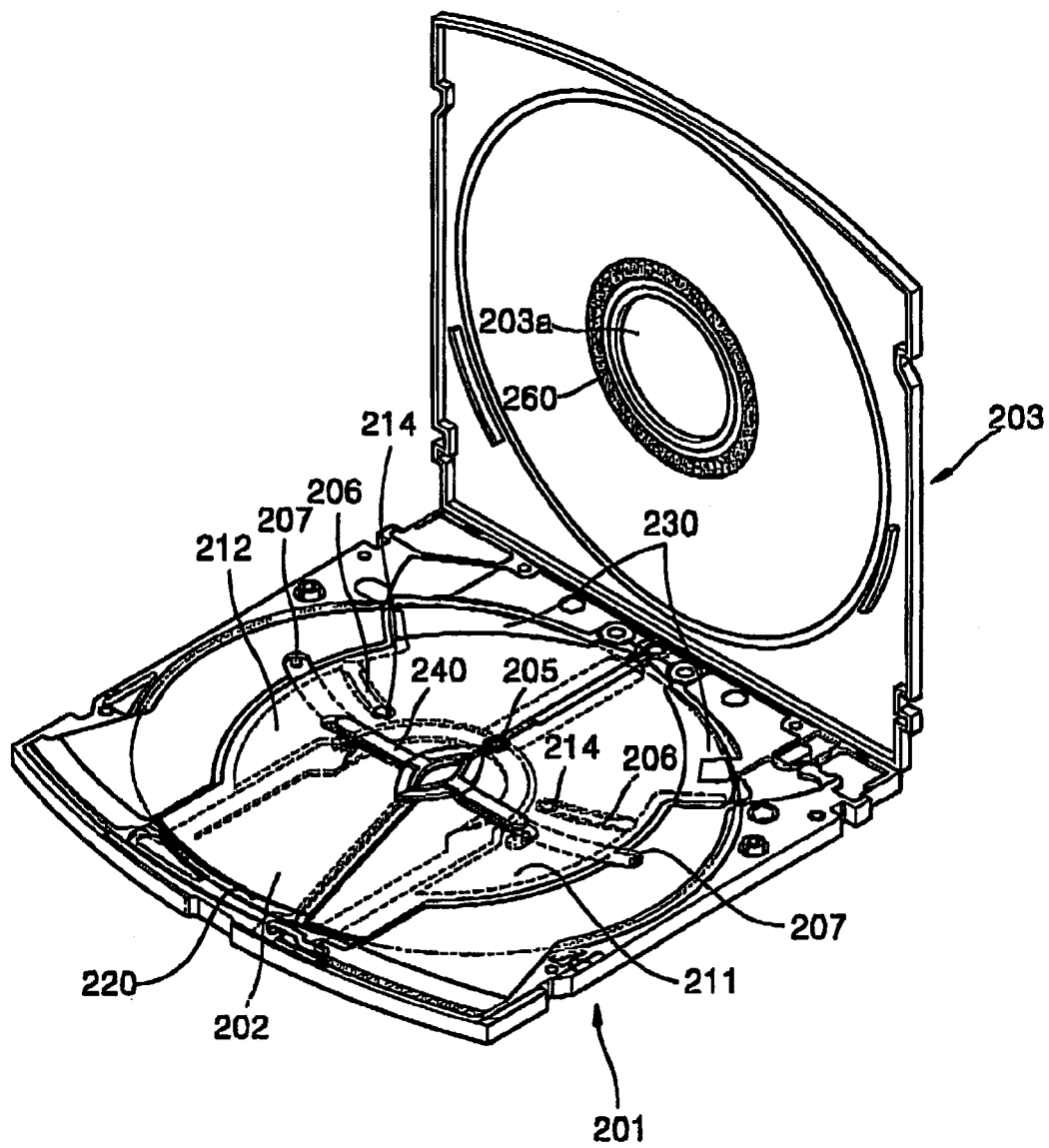
FIG. 4 is a view showing a state in which the disk cartridge of FIG. 3 is assembled.

Referring to FIGS. 3 and 4, a disk cartridge 200 according to an embodiment of the present invention includes a lower case 201 having an opening 202 where a turntable (not shown), on which a disk D is disposed, and an optical pickup device (not shown) are disposed when the disk cartridge 200 is inserted into a disk player (not shown), an upper case 203 installed at the lower case 201 to be open and shut while pivoting, to accommodate the disk D therebetween, a shutter 210 installed at the lower case 201 to slide to open and shut the opening 202, and a close covering member 240 first preventing an information area (recording surface) D2 of the disk D from being contaminated by dust, being lowered with respect to the shutter 210 when the shutter 210 is open, and being raised with respect to the shutter 210 when the shutter 210 is closed, to closely contact an inner circumference of the disk D, that is, a clamping area D1.

The shutter 210 includes first and second shutter portions 211 and 212 installed inside the lower case 201 to pivot symmetrically. Thus, as the first and second shutter portions 211 and 121 pivot in first opposite directions in which they are separated from each other, the opening 202 is open (refer to FIG. 8). When the first and second shutter portions 211 and 121 pivot in second opposite directions in which they are close to each other, the opening 202 is closed (refer to FIG. 6). The shutter 210 includes a connection portion 213 to allow the first and second shutter portions 211 and 212 to interact with each other. Accordingly, as the first shutter portion 211 pivots in a direction, the second shutter portion 212 pivots in an opposite direction to the direction of the first shutter portion 211 by the connection portion 213. A torsion spring 204 elastically biasing the first and second shutter portions 211 and 212 in the second opposite directions of closing the opening 202 is installed between a bottom surface of the lower case 201 and each of the first and second shutter portions 211 and 212. When a force applied to the shutter by the opening lever 120 (refer to FIG. 8) is removed, the shutter 210 returns to an original closed position.

As shown in FIG. 3, the shutter 210 is not symmetric in shape. That is, the first shutter portion 211 has a first surface area, and the second shutter portion 212 has a second surface area different from the first surface area. The first shutter portion 211 and the second shutter portion have a center portion corresponding to a center hole of the disk D or the opening 202 of the case 201. The first and second shutter portions 211, 212 have first portions between the center portion and the connection portion 213 and second portions between the center portion and distal ends of the first and second shutter portions 211, 212 opposite to the connection portion 213 with respect to the center portion. The first portions may have the same surface area, but the second portions may be different in area. The second portions of the first shutter portion 211 and the second shutter portion meet at a line different from a center line passing through the center portion and the connection portion 213.

Figure 6:
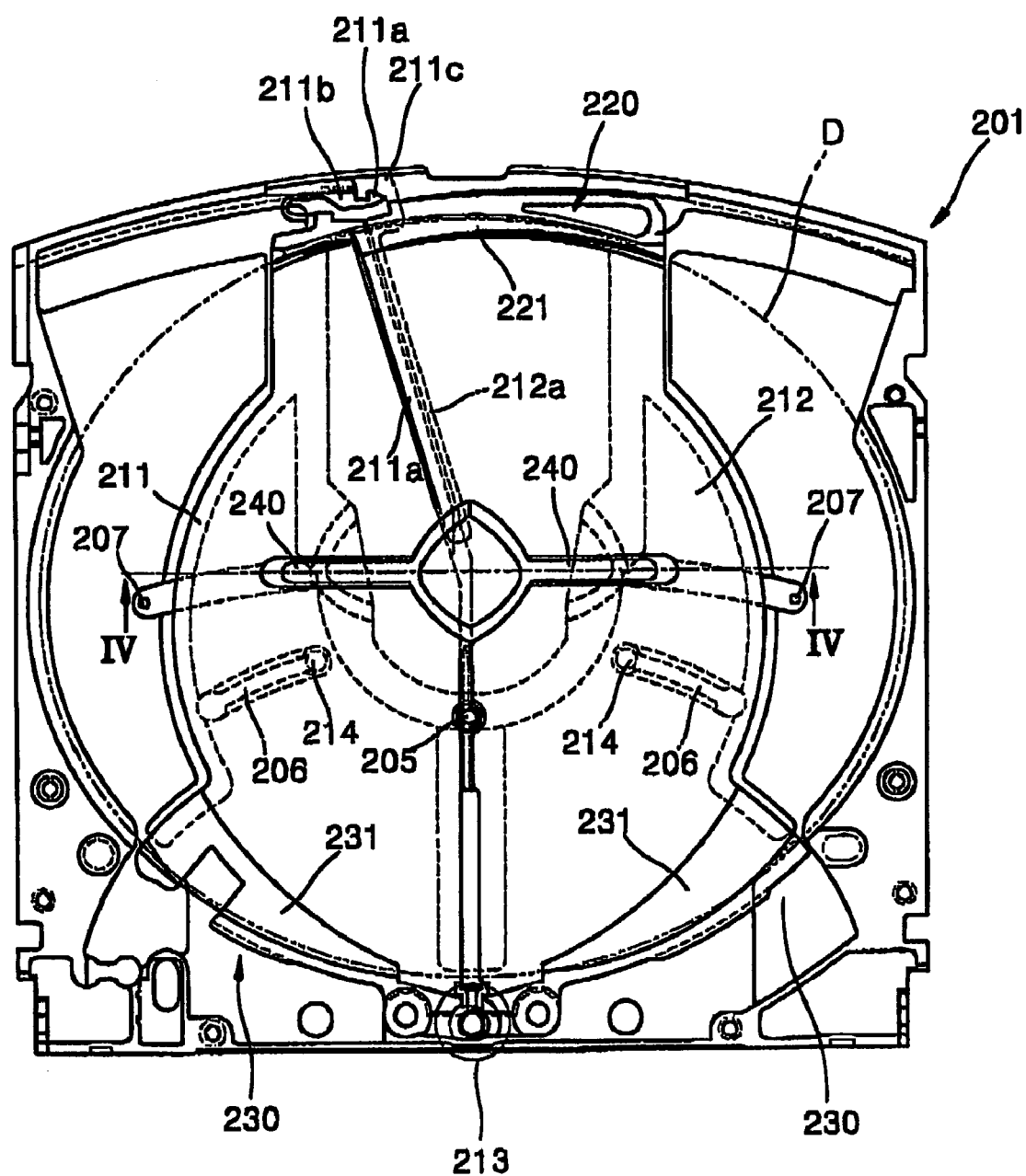
FIG. 6 is a plan view showing a state in which a shutter is closed in the disk cartridge of FIG. 3.
Figure 8:
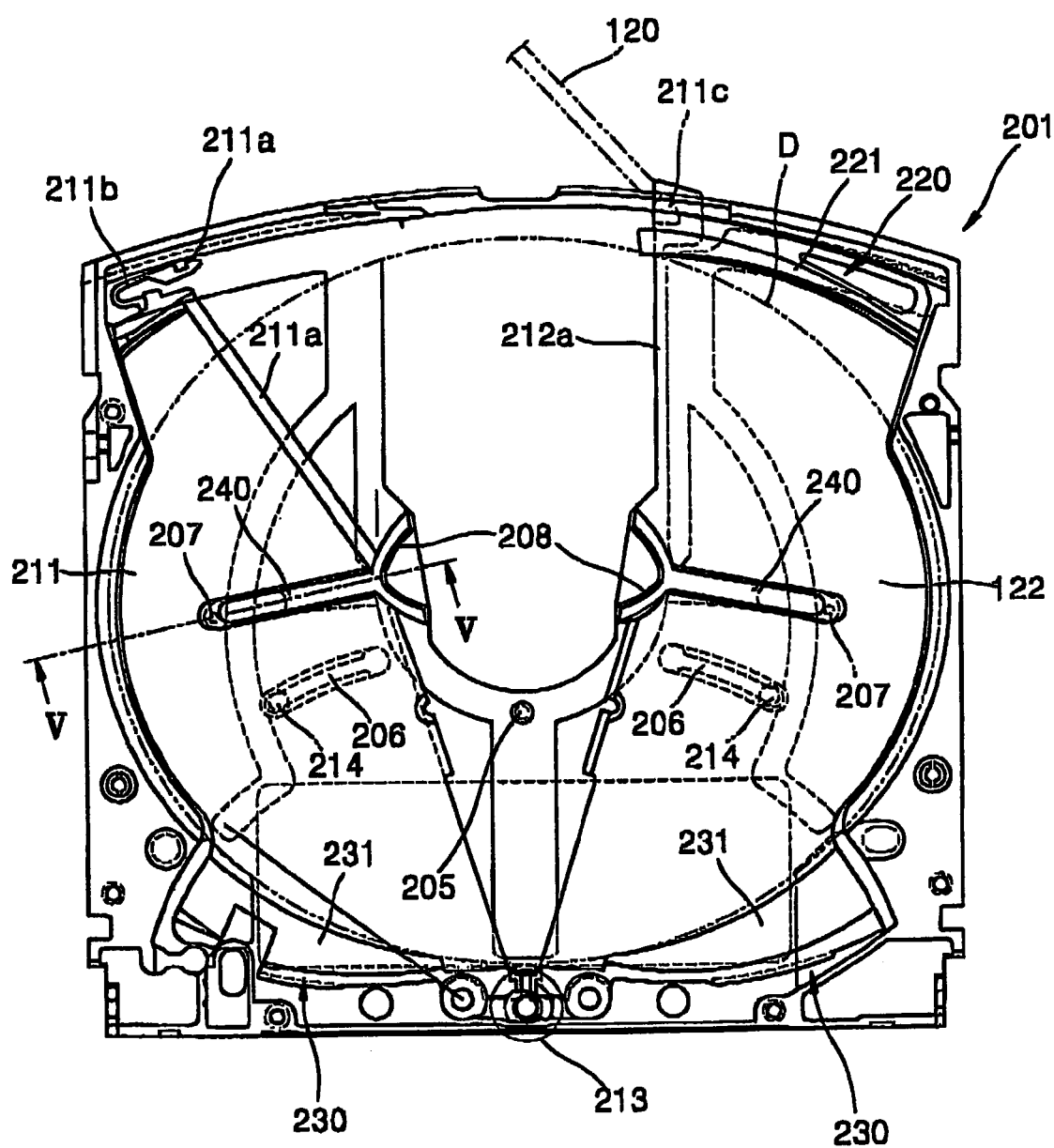
FIG. 8 is a plan view showing a state in which the shutter is open in the disk cartridge of FIG. 3.

Protrusions 230 and 220 contacting an edge portion D3 of an outer circumference of the disk D are formed at the first and second shutter portions 211 and 212, respectively. That is, the disk D includes the clamping area D1 at the inner circumference, the information area D2 where information is recorded, and the edge portion D3 disposed outside the information area D2. Since the edge portion D3 that is one of non-information areas is supported by the protrusions 220 and 230, contact between the information area D2 and the shutter 201 can be avoided. The protrusions 220 and 230 have inclined surfaces 221 and 231 that are inclined toward a center of the accommodated disk D or a major surface of the shutter 210. Thus, as shown in FIG. 6, when the first and second shutter portions 211 and 212 are closed, the edge portion D3 of the disk D is supported by upper ends of the protrusions 220 and 230. When the first and second shutter portions 211 and 212 are open, as shown in FIG. 8, the disk D is lowered along the inclined surfaces 221 and 231. The clamping area D1 of the lowered disk D at the inner circumference thereof is supported by a first support protrusion 205 formed on the lower case 201. Thus, since the disk D does not contact the first and second shutter portions 211 and 212, when the shutter portions 211 and 212 are open, the information area D2 of the disk D is not scratched.

A support hole 215 into which the first support protrusion 205 is inserted, is formed at each of the first and second shutter portions 211 and 212. A plurality of second support protrusions 214 are provided at a rear surface of the first and second shutter portions 211 and 212. Slots 206 are formed on the lower case 201 corresponding to the second support protrusions 214 so that the lower case 201 is not interfered with the second support protrusions 214 when the shutter 210 is open/shut. Thus, when an external force is applied to the first and second shutter portions 211 and 212, the information area D2 of the disk D supported by the second support protrusions 214 is prevented from contacting the first and second shutter portions 211 and 212.

The protrusions 230 of the first and second shutter portions 211 and 212 disposed close to the connection portion 213 may have the same shape, and the inclined surface 231 of the first and second shutter portions 211 and 212 may have the same area or the same inclined angle. To the contrary, the protrusions 220 of the first and second shutter portions 211 and 212 disposed opposite to the connection portion 213 with respect to the center portion may have a different shape, and the inclined surface 221 of the first and second shutter portions 211 and 212 may have a different area or a different inclined angle.

A cut-away portion 216 having a half-oval shape is formed at each of the first and second shutter portions 211 and 212 so that a through hole 218 is formed at the center when the first and second shutter portions 211 and 212 are closed. When the disk D is picked out by opening the upper case 203, a user easily picks the disk D by inserting a finger into a center hole of the disk D. If the through hole 218 is formed at the shutter 210, the user can bend the finger after inserting the finger deeper through the center hole of the disk D so that picking the disk D is made easy. Also, when dust is accumulated on an upper surface of the shutter 210 facing the disk D, the dust can be exhausted through the through hole 218 formed in the shutter 210.

The cut-away portion 216 is formed to be inclined at a predetermined angle with respect to the major surface of the shutter 210. This is to allow a space portion 241 (refer to FIG. 5) having an inclined portion 241a formed thereon, which will be described later, to be raised or lowered along the cut-away portion 216. The disk cartridge 200 further includes a spring cover 250 coupled to the lower case 210.

Figure 5:
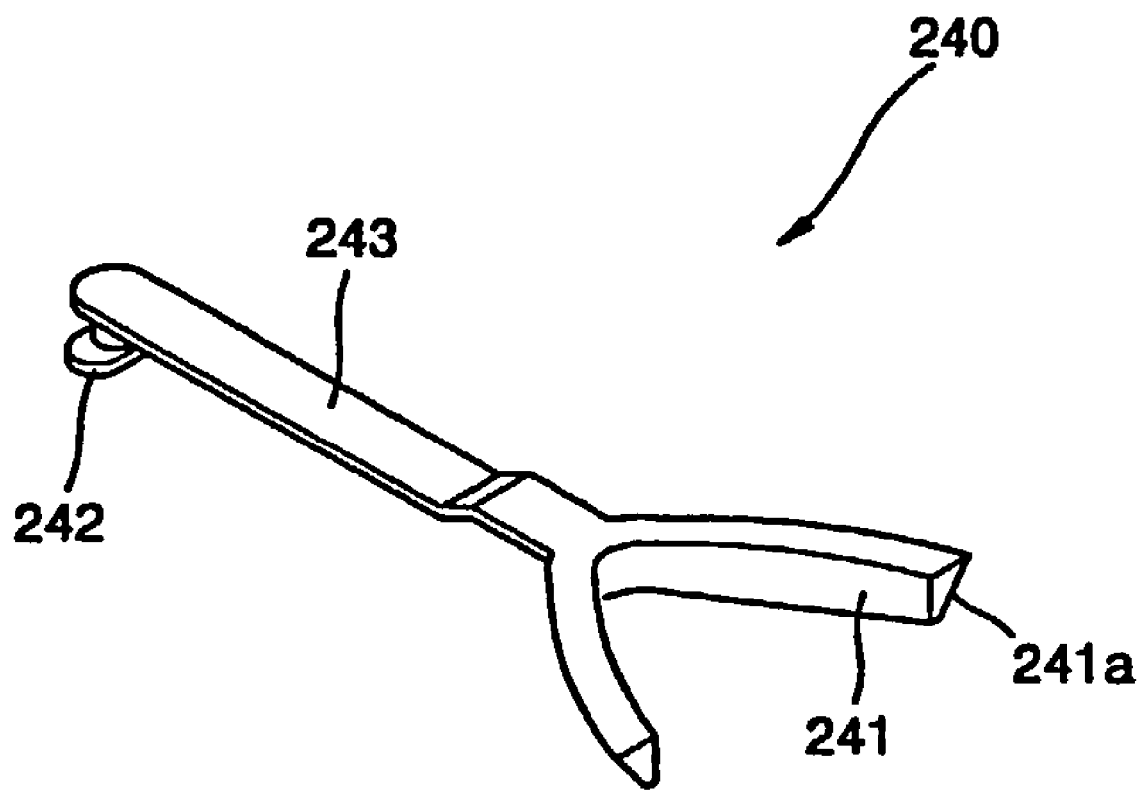
FIG. 5 is a perspective view showing a close covering member of the disk cartridge shown in FIG. 3.

FIG. 5 is a magnified view of the close covering member shown in FIG. 3. Referring to FIG. 5, the close covering member 240 is provided at each of the first and second shutter portions 211 and 212 and includes the space portion 241 having a half-oval shape and the inclined portion 241a formed to be raised or powered along the cut-away portion 216 of the shutter 210, a sliding portion 242 installed to slide along a guide hole 217 (refer to FIG. 3) formed on the shutter 210, and a lever portion 243 connecting the space portion 241 to the sliding portion 242 to be elastically deformed.

When the shutter 210 is closed, the space portion 241 provided at each of the first and second shutter portions 211 and 212 is raised along the cut-away portion 216 so that corresponding ones of ends of the space portions 241 contact each other, and an upper surface of the space portion 241 closely contacts the clamping area D1 of the disk D. When the shutter 210 is open, the space portions 241 are lowered along the cut-away portion 216, separated from each other, and separated from the clamping area D3 of the disk D.

The close covering member 240 has a height from the major surface of the shutter 210 lower than that of a lowest portion of the inclined surfaces 221, 231 of the protrusions 220, 230 of the shutter 210 where the disk D contacts when the shutter is opened.

A sealing portion is provided on an upper surface of the space portion 241 to prevent introduction of a foreign material, such as dust, through the shutter 210 when the sealing portion closely contacts the clamping area D1 of the disk D. The sealing portion is formed of a material, for example, non-woven fabric, capable of being elastically deformed when receiving a pressing force.

A parking portion 208 (refer to FIG. 3) is formed at the lower case 201 so that, when the shutter 210 is open, the space portion 214 is inserted. The inclined portion 241a of the space portion 241 is formed to contact the cut-away portion 216 to be inclined to slide along the cut-away portion 216.

Figure 7:
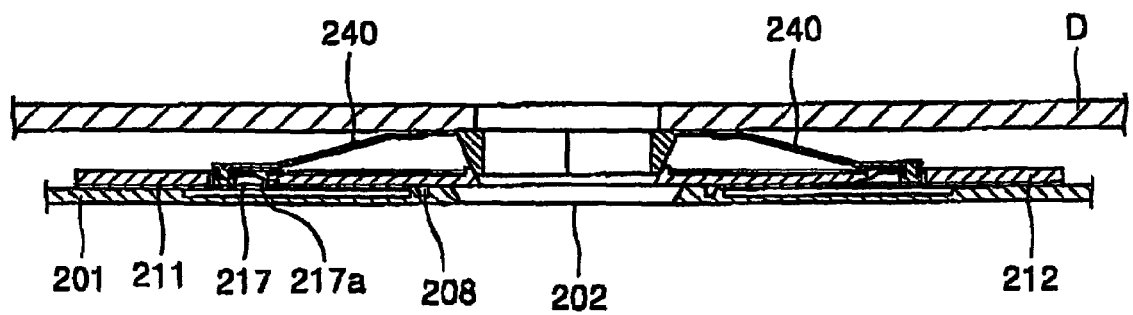
FIG. 7 is a sectional view taken along line IV—IV of FIG. 6.
Figure 9:
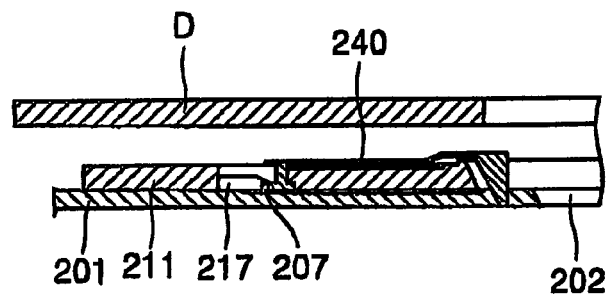
FIG. 9 is a sectional view taken along line V—V of FIG. 8.

An inclined surface 217a is provided at each of the first and second shutter portions 211 and 212 to define a portion of the guide hole 217 as shown in FIGS. 7 and 9. When the space portion 241 rises, the sliding portion 242 is raised from a lower surface of the shutter 210. When the space portion 241 is lowered, the sliding portion 242 is lowered to the lower surface of the shutter 210. That is, when the shutter 210 is closed, since the sliding portion 242 is disposed at a rising position from a lower surface of the shutter 210, the space portion 241 is raised along the cut-away portion 216 so that the lever portion 243 can be easily elastically deformed.

To the contrary, when the shutter 210 is open, since the sliding portion 242 is disposed at the lower surface of the shutter 210 and inserted into the guide hole 217, a spindle motor (not shown) can be stably operated in the opening 202 without an interference with the shutter 210 and the close covering member 240.

An interference portion 207 (refer to FIG. 3) protrudes from the lower case 201 to interfere with the sliding portion 242 so that the space portion 241 is smoothly inserted into the parking portion 208. The interference portion 207 is disposed at the lower case 201 within an angle less than a maximum open angle of the shutter 210. A sliding groove (not shown) is formed at a rear surface of the shutter 210 so that the shutter 210 being opened or shut is not interfered with the interference portion 207.

A clamping hole 203a (refer to FIG. 3) is formed in the upper case 203 into which a clamping apparatus entering the disk drive and clamping the disk D is inserted. A sealing member 260 is provided around the clamping hole 203a to prevent the introduction of the foreign material, such as the dust, through the clamping hole 203a so that the information area D2 of the disk D is secondarily prevented from being contaminated by the dust. The sealing member 260 can be provided to contact the edge portion D3 at the outer circumference of the disk D.

An operation of the disk cartridge 200 according to the present invention will be described with reference to the attached drawings.

Figure 11:
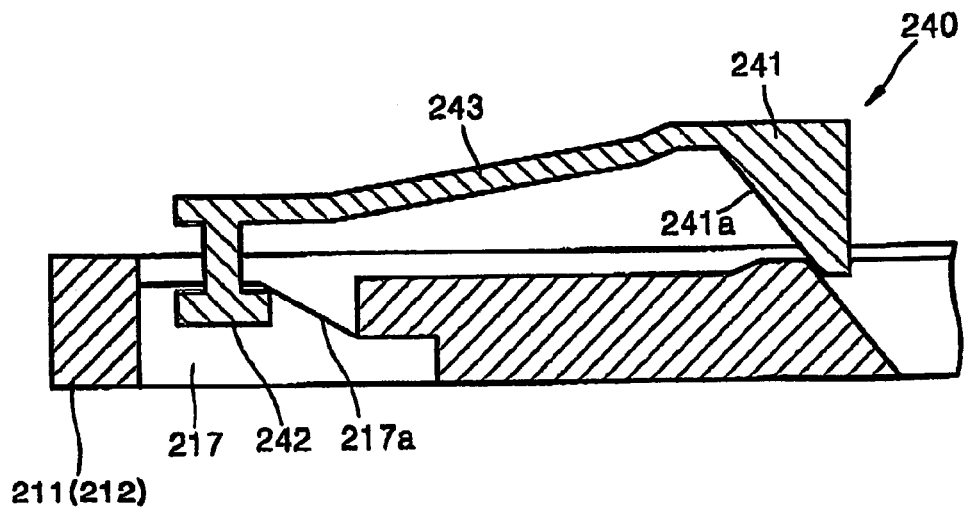
FIG. 11 is a sectional view schematically showing another operational relationship between the close covering member and the guide hole when the shutter is closed.

FIG. 6 is a plan view showing a state in which the shutter 210 of the disk cartridge 200 of FIG. 3 is closed. FIG. 7 is a sectional view taken along line IV—IV of FIG. 6. FIG. 8 is a plan view showing a state in which the shutter 210 of the disk cartridge 200 of FIG. 3 is open. FIG. 9 is a sectional view taken along line V—V of FIG. 8. FIG. 11 is a sectional view showing an operational relationship between the close covering member 240 and the guide hole 217 when the shutter 210 is closed.

Figure 10:
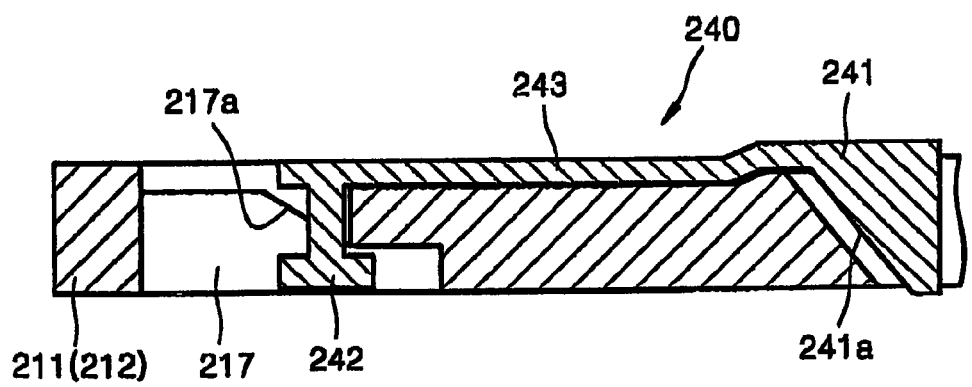
FIG. 10 is a sectional view schematically showing an operational relationship between the close covering member and a guide hole when the shutter is open.

Referring to FIGS. 8, 9 and 10, the disk cartridge 200 where the disk D is loaded, as shown in FIGS. 6, enters a disk drive apparatus (not shown) in the state in which the shutter 210 is closed, and the upper and lower cases 203 and 201 are closed.

As the disk cartridge 200 enters the disk drive apparatus, the opening lever 120 installed at the disk drive apparatus pushes a locking piece 211a to be unlocked from a stop portion 211c and pushes an interference piece 211b to have the first shutter portion 211 pivot counterclockwise on the drawing. Then, the second shutter portion 212 pivots clockwise by the connection portion 213 having an engagement gear. Accordingly, the opening hole 202 is open between the first and second shutter portions 211 and 212. Here, since the protrusions 220 and 230 of the first and second shutter portions 211 and 212 only contact the disk D and a contact portion is limited to the edge portion D3 of the disk D which is the non-information area, there is little possibility of the information area of the recording surface being damaged during the opening/shutting operation of the shutter 210. As the shutter 210 is open, the disk D is lowered along the inclined surfaces 221 and 231 of the protrusions 220 and 230 and is temporarily supported on the first support protrusion 205.

As the corresponding ones of the ends of the space portions 241 of the close covering members 240 closely contact each other, the upper surface of the space 241 closely contacts the clamping area D1 of an inner side (inner circumference) of the disk D. As the shutter 210 is open, the sliding portion 242 moves along the guide hole 217. Then, the space portion 241 is lowered along the cut-away portion 216. The sliding portion 242 moves along the inclined surface 217a of the guide hole 217 to the lower surface of the shutter 210. When the sliding portion 242 contacts the interference portion 207, the space portion 241 is inserted into the parking portion 208.

In this state, the turntable of the disk drive apparatus enters the opening 202 which is open, and the damper enters the clamping hole 203a of the upper case 203 to clamp the disk D supported by the first guide protrusion 205. Then, as the turntable rotates, a recording/reproducing process is performed with respect to the disk D.

Next, referring to FIGS. 5, 6, and 11, when the recording/reproducing process is completed, and the turntable and the damper are removed from the disk cartridge 200, the clamping area D1 of the disk D is supported on the first protrusion 205. In this state, when the disk cartridge 200 is ejected from the disk drive apparatus, the first and second shutter portions 211 and 212 pivot to their original closed positions, and the opening 202 is closed. Here, the edge portion D3 at the outer circumference of the disk D is raised along the inclined surfaces 221 and 231 of the protrusions 220 and 230. Thus, even when the dust is introduced through the clamping hold 203a, since the edge portion D3 at the outer circumference of the disk D closely contacts the sealing member 260, the introduction of the dust in the information area D2 of the disk D is prevented.

When the shutter 210 is closed, the sliding portion 242 is released from the interference with the interference portion 207 and slides along the guide hole 217. Then, the space portion 241 is separated from the parking portion 208 and is raised along the cut-away portion 216. When the first and second shutter portions 211 and 212 are closed, the space portions 241 of the close covering members 240 provided at the first and second shutter portions 211 and 212 contact each other to closely contact the clamping area D1 at the inner circumference of the disk D which is the non-information area, so that the foreign material, such as the dust, is prevented from being introduced in the information area D2.

As a result, the disk D closely contacts the upper case 203 by the sealing member 260 and is fixed between the upper and lower cases 203 and 201 by closely contacting the shutter 210 using the close covering member 240 so that the possibility of the disk cartridge 200 being damaged during carrying is lowered.

As described above, the disk cartridge according to the present invention has the following effects.

First, since the sealing member closely contacts the clamping area at the inner circumference of the disk when the shutter is closed, introduction of dust is prevented so that the possibility of the information area of the disk being contaminated is lowered.

Second, since the disk is fixed between the upper and lower cases using the sealing member provided around the clamping area at the inner circumference of the disk, while the disk is carried, noise and damage can be reduced.

While this invention has been particularly shown and described with reference to preferred embodiments thereof, it will be understood by those skilled in the art that various changes in form and details may be made therein without departing from the spirit and scope of the invention as defined by the appended claims and their equivalents.

What is claimed is:

1. A disk cartridge comprising:
    a first case having an opening;
    a second case coupled to the first case to cover the first case;
    a shutter disposed between the first and second cases to open and shut the opening; and
    a close covering member disposed between the shutter and the second case to move in a first direction from the shutter to the second case and in a second direction from the second case to the shutter in response to a movement of the shutter, wherein the shutter comprises a cut-away portion formed on a center area of the shutter, and the close covering member comprises:
    a sliding portion movably coupled to the shutter;
    a space portion disposed in the cut-away portion of the shutter; and
    a lever portion disposed between the sliding portion and the space portion.

2. The disk cartridge as claimed in claim 1, wherein the first case comprises a parking portion defining a portion of the opening of the first case, and the space portion of the close covering member is disposed in the parking portion when the shutter opens the opening of the first case.

3. The disk cartridge as claimed in claim 1, wherein the space portion of the close covering member has a shape corresponding to the parking portion of the first case.

4. The disk cartridge as claimed in claim 1, wherein the shutter comprises a guide hole, and the sliding portion of the close covering member is movably disposed in the guide hole and moves along the guide hole in response to the movement of the shutter.

5. The disk cartridge as claimed in claim 4, wherein the shutter rotates an axis, and the guide hole is formed in a circular direction from the axis.

6. The disk cartridge as claimed in claim 4, wherein the first case comprises:
    an interference portion disposed to correspond to a position of the guide hole to interfere with the sliding portion of the close covering member.

7. The disk cartridge as claimed in claim 6, wherein the interference portion of the first case prevents the close covering member from moving together with the shutter when the shutter moves with respect to the first case.

8. The disk cartridge as claimed in claim 7, wherein the shutter has a maximum open angle with respect to a center line of the opening of the first case, and the interference portion of the first case is disposed to be at an angle less than the maximum open angle of the shutter with respect to the center line of the opening of the first case.

9. The disk cartridge as claimed in claim 6, wherein the cut-away portion of the shutter comprises a cut-away surface inclined with respect to a major surface of the shutter, and the space portion of the close covering member comprises a first inclined portion corresponding to the cut-away surface of the cut-away portion of the shutter.

10. The disk cartridge as claimed in claim 9, wherein the shutter comprises a second inclined portion defining a portion of the guide hole of the shutter to correspond to the sliding portion of the close cover member.

11. The disk cartridge as claimed in claim 10, wherein the sliding portion of the close covering member moves along the second inclined portion of the shutter when the shutter opens or shuts the opening of the first case.

12. The disk cartridge as claimed in claim 11, wherein the space portion of the close cover member moves along the cut-away surface of the cut-away portion of the shutter when the shutter opens or shuts the opening of the first case.

13. The disk cartridge as claimed in claim 10, wherein the first inclined surface of the space portion of the close covering member is spaced-apart from the cut-away surface of the cut-away portion of the shutter when the shutter opens the opening of the first case.

14. The disk cartridge as claimed in claim 10, wherein the lever portion of the close covering member moves to be closer to the shutter from the second case when the shutter moves to open the opening of the first case.

15. The disk cartridge as claimed in claim 10, wherein the space portion of the close cover member moves along the cut-away surface of the cut-away portion of the shutter toward the first case when the shutter moves to open the opening of the first case.

16. The disk cartridge as claimed in claim 10, wherein the first inclined surface of the space portion of the close covering member moves along the cut-away surface of the cut-away portion of the shutter toward the second case when the shutter moves to close the opening of the first case.

17. The disk cartridge as claimed in claim 10, wherein the lever portion of the close covering member moves to be spaced-apart from the shutter toward the second case when the shutter moves to close the opening of the first case.

18. The disk cartridge as claimed in claim 17, wherein the lever portion of the close covering member is bent with respect to the shutter to allow the space portion of the close cover member to move toward the second case from the shutter when the first inclined surface of the close cover member moves along the cut-away surface of the cut-away portion, and the sliding portion of the close cover member moves along the second inclined surface of the shutter.

19. The disk cartridge as claimed in claim 10, wherein the space portion of the close cover member moves along the cut-away surface of the cut-away portion of the shutter toward the second case from the first case when the shutter moves to close the opening of the first case.

20. The disk cartridge as claimed in claim 1, wherein the lever portion of the close cover member comprises:
a flexible material.

21. The disk cartridge as claimed in claim 1, wherein the lever portion of the close cover member is spaced-apart from the shutter and bent with respect to the shutter to lift the space portion to move toward the second case when the shutter shuts the opening of the first case.

22. A disk cartridge comprising:
a first case having an opening;
a second case coupled to the first case to cover the first case;
a shutter disposed between the first and second cases, and having first and second shutter portions movably coupled to one of the first and second cases to open/shut the opening of the case; and
a close covering member disposed between the shutter and the second case, and having first and second close covering members movably coupled to corresponding ones of the first and second shutter portions to move between the shutter and second case in response to a movement of the first and second shutter portions.

23. The disk cartridge as claimed in claim 22, wherein shutter comprises:
first and second axles mounted on the case about which the first and second shutter portions rotate, respectively.

24. The disk cartridge as claimed in claim 22, wherein the shutter comprises a connection portion formed between the first and second shutter portions, and the first shutter portion is rotated by the connection portion transmitting a movement of the second shutter portion to the first shutter portion.

25. The disk cartridge as claimed in claim 22, wherein the first shutter portion has a first area, and the second shutter portion has a second area larger than the first area.

26. The disk cartridge as claimed in claim 22, wherein each of the first and second shutter portions comprises:
an axle portion about which a corresponding one of the first and second shutter portions rotates;
a center portion corresponding to a center hole of the disk;
a first area portion disposed adjacent to the axle portion; and
a second area portion disposed opposite to the axle portion with respect to the center portion.

27. The disk cartridge as claimed in claim 26, wherein the first area portion of the first shutter portion is the same as that of the second shutter portion, and the second area portion of the first shutter portion is different from that of the second shutter.

28. The disk cartridge as claimed in claim 26, wherein the first area portion of the first shutter portion meets the first area portion of the second shutter portion at a center line passing through the center portion and between the axle portions.

29. The disk cartridge as claimed in claim 28, wherein the second area portion of the first shutter portion meets the second area portion of the second shutter portion at a line different from the center line.

30. The disk cartridge as claimed in claim 22, wherein the first and second shutter portions are not symmetric.

31. The disk cartridge as claimed in claim 22, wherein:
the first shutter portion comprises,
first protrusions protruding toward the cover and having first inclined surfaces inclined with respect to a major surface of the shutter; and
the second shutter portion comprises,
second protrusions protruding toward the cover and having second inclined surfaces inclined with respect to the major surface of the shutter.

32. The disk cartridge as claimed in claim 31, wherein the disk moves along the first and second inclined surfaces when the first and second shutter portions open/shut the opening of the case.

33. The disk cartridge as claimed in claim 31, wherein the first protrusions of the first shutter portion have different shapes.

34. The disk cartridge as claimed in claim 31, wherein the first inclined surfaces of the first protrusions of the first shutter portion are different in an angle formed with the major surface of the shutter.

35. The disk cartridge as claimed in claim 31, wherein one of the first protrusions of the first shutter is the same as one of the second protrusions of the second shutter portion.

36. The disk cartridge as claimed in claim 31, wherein one of the first protrusions of the first shutter is different from the second protrusions of the second shutter portion.

37. The disk cartridge as claimed in claim 31, wherein the case comprises an axle portion about which the first and second shutter portions rotate, and one of the first protrusions disposed close to the axle portion is different from the other one of the first protrusions disposed opposite to the axle portion with respect to a center of the first shutter portion.

38. The disk cartridge as claimed in claim 37, wherein the one of the first protrusions disposed close to the axle portion is larger than the other one of the first protrusions disposed opposite to the axle portion with respect to the center of the first shutter portion.

39. The disk cartridge as claimed in claim 37, wherein the first and second protrusions are disposed in a circular direction from a center of the disk.

40. The disk cartridge as claimed in claim 37, wherein the first inclined surfaces of the first protrusions and the second surfaces of the second protrusions are inclined toward a line between the first and second shutter portions.

41. The disk cartridge as claimed in claim 22, wherein the first and second shutter portions comprise a plurality of protrusions protruding from a major surface of the shutter toward the second case and having inclined surfaces inclined with respect to the major surface of the shutter.

42. The disk cartridge as claimed in claim 41, wherein the first and second close covering members have a height from the major surface of the shutter less than those of the inclined surfaces of the protrusions.

43. The disk cartridge as claimed in claim 41, wherein the shutter and the second case form a space to accommodate a disk, and wherein the first and second close covering members are disposed between the disk and the shutter.

44. The disk cartridge as claimed in claim 43, wherein the disk comprises a non-information portion, and the first and second close covering members selectively contact the non-information portion of the disk according to the movement of the first and second shutter portions.

45. The disk cartridge as claimed in claim 43, wherein the first and second close cover members selectively contact the first case according to the movement of the first and second shutter portions.

46. The disk cartridge as claimed in claim 43, wherein each of the first and second shutter portions comprises:
a cut-away portion disposed to correspond to a center of the disk and the opening of the first case; and
a cut-away surface formed on the cut-away portion, inclined with respect to the disk, and facing the disk.

47. The disk cartridge as claimed in claim 46, wherein the first and second close cover members are movably disposed on corresponding ones of the cut-away portions of the first and second shutter portions.

48. The disk cartridge as claimed in claim 47, wherein the disk moves in a first direction toward the first case from the second case along the inclined surfaces of the protrusions and in a second direction opposite to the first direction when the first and second shutter portions move to open and shut the opening of the first case, respectively.

49. The disk cartridge as claimed in claim 47, wherein the first and second close cover members move in a first direction toward the first case from the second case along corresponding ones of the cut-away surfaces of the first and second close cover members and in a second direction opposite to the first direction when the first and second shutter portions move to open and shut the opening of the first case, respectively.

50. The disk cartridge as claimed in claim 47, wherein:
each of the first and second shutter portions comprises,
a surface defining a guide hole; and
each of the first and second close cover members comprises,
a space portion corresponding to the cut-away portion of a corresponding one of the first and second shutter portions,
a sliding portion movably coupled to the surface of the guide hole of a corresponding one of the first and second shutter portions, and
a connection portion disposed between the space portion and the sliding portion of the corresponding one of the first and second shutter portions.

51. The disk cartridge as claimed in claim 50, wherein the surface of the guide hole and the cut-away surface of the cut-away portion are inclined with respect to the disk.

52. The disk cartridge as claimed in claim 50, wherein the first case comprises:
a plurality of interference portions each disposed on a portion of a corresponding one of the guide holes of the first and second shutter portions to prevent a corresponding one of the first and second close cover members from moving together with a corresponding one of the first and second shutter portions.

53. The disk cartridge as claimed in claim 50, wherein the first case comprises:
a parking portion defining a portion of the opening and accommodating the space portions of the first and second close cover members.

54. The disk cartridge as claimed in claim 53, wherein the first and second close cover members contact one of the parking portion and the non-information portion of the disk.

55. The disk cartridge as claimed in claim 53, wherein the disk comprises a first non-information portion and a second non-information portion disposed at opposite sides of the disk, the first and second close cover members selectively contact the first non-information portion of the disk, and the second case selectively contacts the second non-information portion of the disk.

56. The disk cartridge as claimed in claim 55, wherein the second case comprises:
a seal member disposed to correspond to the second non-information portion of the disk.

57. The disk cartridge as claimed in claim 55, wherein the seal member and the first and second close cover members contact the first non-information portion and the second non-information portion of the disk, respectively, to prevent dust from being introduced on the disk when the first and second shutter move to close the opening of the first case.

* * * * *